Oct. 21, 1930.  G. F. SCHOLLE  1,779,016

POULTRY FEEDER

Filed Feb. 24, 1928

Inventor
GUSTAV F. SCHOLLE.
By E. H. Bond
Attorney

Patented Oct. 21, 1930

1,779,016

UNITED STATES PATENT OFFICE

GUSTAV F. SCHOLLE, OF CONCORDIA, MISSOURI

POULTRY FEEDER

Application filed February 24, 1928. Serial No. 256,547.

This invention relates to certain new and useful improvements in poultry feeders of that class for dry mash feed, having for its object, among others, to provide a simple, cheap yet efficient and durable poultry feeder and regulator wherein the feed will not clog or waste, there being always a steady flow of clean, wholesome feed to the feed troughs.

It has for a further object to provide a device of this general character embodying a rectangular-shaped funnel, tapered from its upper point on all four sides and extending only a part way up into the hopper. This serves to cause the feed to flow downwardly and outwardly equally into the four troughs of the hopper, thus insuring a constant, even, automatic flow of the feed into the trough as it is eaten out by the poultry.

The present invention is applicable for use with the feed regulator mechanism shown in my prior Patent, No. 1,488,028, issued March 25, 1924, and when combined therewith constitutes a most efficient, satisfactory poultry feeder and regulator.

Other objects and advantages of the invention will hereinafter appear, and the novel features thereof will be particularly pointed out in the appended claim.

Figure 1:
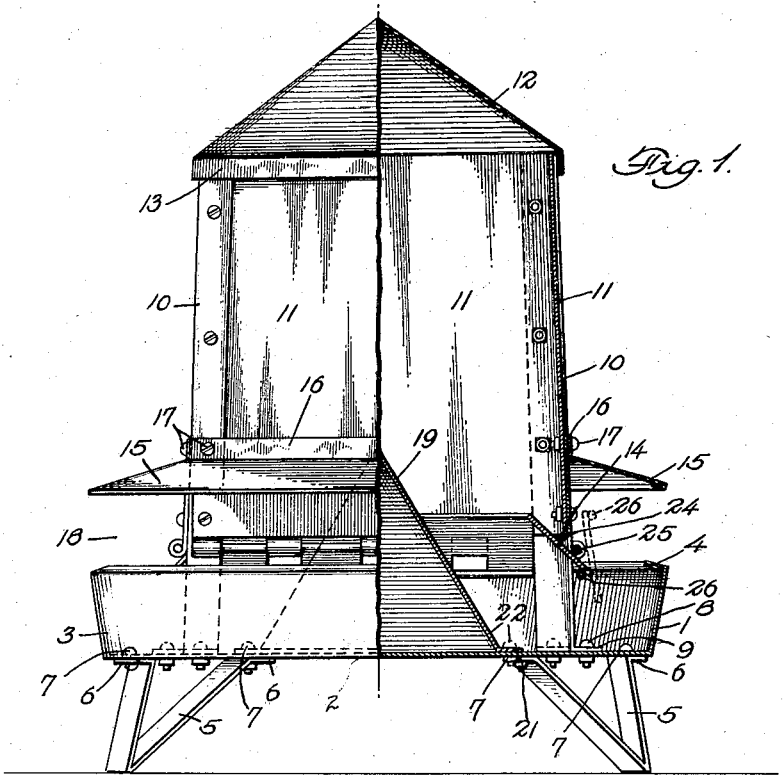

The invention, in its preferred form, is clearly illustrated in the accompanying drawings, which, with the numerals of reference marked thereon, form a part of the specification, and in which, Fig. 1 is a perspective view broken away, substantially at its mid center, and showing parts in section.

Figure 2:
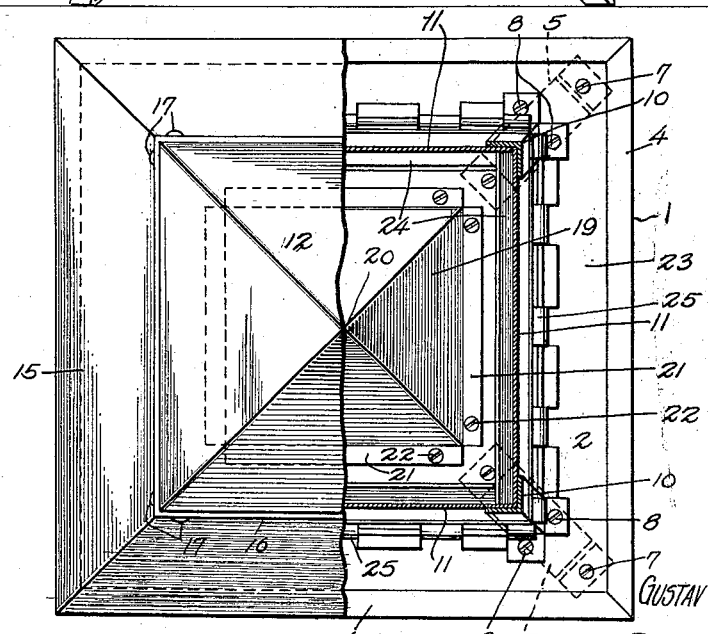

Fig. 2 is a top plan view of Fig. 1, being correspondingly broken away.

Like numerals of reference indicate like parts of the several views throughout the specification.

While I deem it preferable and in the present instance have chosen to show my feeder as substantially square in form, it is evident that this general shape may be varied and still embody the characteristic features of the invention now to be described.

Referring to the drawings 1 designates the trough portion herein shown as substantially square, comprising a bottom 2, with side walls 3, which may or may not taper as shown in Fig. 1, the upper edges of said side walls being extended inwardly as seen in Figs. 1 and 2 to form the inwardly surrounding ledge 4, which serves an important function in that it prevents scattering of the feed by the poultry.

This body trough portion 1 is supported upon legs 5, one beneath each corner, the same being angular in form and having their ends provided with flanges 6 through which pass bolts or the like 7, which serve to fasten them to the under side 2 of the body 1. As seen best in Fig. 2, these legs are disposed angularly and inwardly from the corners of the body so as to afford excellent support and give rigidity to the body to prevent accidental shifting of its position.

Secured to the upper face of the bottom 2, as by bolts or the like 8, passing through flanges 9 thereof, are the uprights 10, one at each corner, the same being inclined slightly inwardly as shown in Fig. 1, and secured thereto are the four side walls 11, which extend to and terminate at the upper ends of the members 11, which latter are angular in form, as seen in Fig. 2. This forms the hopper.

12 is a top having a depending flange 13 fitted over the chamber formed by the four walls 11, and this flange fits snugly over the other ends of the angular uprights 10, as seen in Fig. 1. This hopper forms a housing to which other parts soon to be described are affixed.

The side walls 11 at their lower ends terminate at a point substantially parallel with or slightly above the plane of the flanges 4, as seen at 14 in Fig. 1, while surrounding the said walls 11 at a point somewhat above the lower ends of the walls 11 is the outwardly and downwardly inclined flange 15, which extends upon all four sides of the device, having an upwardly extending flange 16 embracing the side walls 11 and secured to the corner angular members 10 by bolts or the like 17, as seen clearly in Fig. 1. The angular members 10 form sufficient support for the flange member 15, which latter, as seen clearly in Fig. 1, is disposed at a material distance from the ledge 4, so as to provide sufficient opening 18 to allow the poultry to get ready access to the feed. The outer edge of the flange 15 is disposed substantially in vertical alignment with the flange or ledge 4 of the side walls 3 of the trough member.

Disposed centrally within the enclosure, and secured to the bottom wall 2 is the inverted funnel-shaped member 19 having its four sides disposed substantially parallel to the four side walls of the device, but extending upwardly to meet at a central point 20 as seen clearly in Fig. 2.

This member 19 has its lower edges flanged as at 21 and through these flanges extend screws or the like 22 which secure the same to the bottom wall 2 as seen in Figs. 1 and 2. These inclined walls serve to cause the feed to flow by gravity, downwardly and outwardly to the troughs 23 formed around the four sides of the device.

The surrounding trough permits of the ready access of the fowl to the feed as it gradually flows down the inclined walls of the funnel. The inturned flange 4, together with the depth of the trough and the close proximity of the member 15 serves to protect the scattering and waste of the food by the fowl.

Referring now to Fig. 1, 24 designates a valve or gate pivoted off its center as seen at 25, the same being provided at its lower edge with a counterbalance weight 26 of any suitable construction. When the feed in the hopper is exhausted, or before it is filled, the valve member stands in the position shown by full lines in Fig. 1, being thus held by reason of its counterweight. Feed being placed in the device through the top thereof, after the cover 12 is removed, the said feed falling upon the valve 24 throws the same down to the dotted line position shown in Fig. 1. This bars the entrance of the beak or bill of the fowl so that it cannot get access to the feed except that which is in the trough. It also serves to prevent too much feed flowing into the trough within reach of the fowl. When the food has become exhausted, the weight 26 automatically returns the member 24 to its initial position.

The parts may all be affixed in position, removably, for instance, as by screws as shown, whereby the device may be readily collapsed for the purpose of shipment or storage.

Modifications in detail such as size, relative shape and position of parts, etc., may be resorted to without departing from the spirit of the invention or sacrificing any of its advantages.

What is claimed is:—

A poultry feeder comprising a body member having upwardly-extending walls to form a surrounding trough, an inwardly-extended ledge on the upper edge of said trough, uprights rising from the bottom wall of the body member, an enclosing portion supported by said uprights and terminating at its lower edge above the upper edge of the trough, an automatic counter-weighted gravitating feed-controlling member mounted upon the uprights, and an outwardly and downwardly inclined flange disposed above said ledge and feed-controlled member at a sufficient distance to permit actuation of the feed-controlling member and to protect the latter.

In testimony whereof I affix my signature.

GUSTAV F. SCHOLLE.